(12) United States Patent
Monogioudis et al.

(10) Patent No.: US 10,582,332 B2
(45) Date of Patent: Mar. 3, 2020

(54) AUTONOMOUS LOCALIZATION IN WIRELESS NETWORKS

(71) Applicant: Alcatel-Lucent USA Inc., Murray Hill, NJ (US)

(72) Inventors: Pantelis Monogioudis, Randolph, NJ (US); Tahsina Farah Sanam, Piscataway, NJ (US); Dandan Wang, Hoboken, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 0 days.

(21) Appl. No.: 15/837,621

(22) Filed: Dec. 11, 2017

(65) Prior Publication Data
US 2019/0182614 A1 Jun. 13, 2019

(51) Int. Cl.
*H04W 4/02* (2018.01)
*H04B 17/318* (2015.01)
(Continued)

(52) U.S. Cl.
CPC ............. *H04W 4/02* (2013.01); *G01S 5/0036* (2013.01); *G01S 5/02* (2013.01); *G01S 5/0252* (2013.01);
(Continued)

(58) Field of Classification Search
CPC ............................... H04W 4/02; H04W 64/00; G01S 5/02; G01S 5/0252; G01S 5/0294; G01S 5/0036; G01S 5/0278; H04B 17/318
See application file for complete search history.

(56) References Cited

U.S. PATENT DOCUMENTS

2009/0005972 A1* 1/2009 de Koning ............. G01C 21/30
701/532
2011/0021208 A1 1/2011 Sheynblat
(Continued)

FOREIGN PATENT DOCUMENTS

WO WO 2004/008795 A1 1/2004

OTHER PUBLICATIONS

International Search Report and Written Opinion dated Feb. 27, 2019 in corresponding PCT Application No. PCT/US2018/064430, 16 pages.

*Primary Examiner* — Mazda Sabouri
(74) *Attorney, Agent, or Firm* — Tong, Rea, Bentley & Kim, LLC

(57) ABSTRACT

The present disclosure generally discloses an autonomous localization capability configured to determine the localization of a mobile device of a wireless communication network based on a sequence of observations reported by the mobile device and a model that represents the motion and observations of mobile devices of the wireless communication network. The model that represents the motion and observations of the mobile devices may be a Hidden Markov Model (HMM) constructed based on use of localization information to define the hidden states of the and use of signal strength measurement reporting information to define possible observations. The localization problem for determining a localization of a given mobile device then becomes a maximum a posterior problem represented by the HMM, which may be solved using a particle filter based localization algorithm using localization probability distribution information which may be determined based on signal strength measurement reporting information.

18 Claims, 6 Drawing Sheets

(51) Int. Cl.
*G01S 5/02* (2010.01)
*H04W 64/00* (2009.01)
*G01S 5/00* (2006.01)

(52) U.S. Cl.
CPC .......... *G01S 5/0278* (2013.01); *G01S 5/0294* (2013.01); *H04B 17/318* (2015.01); *H04W 64/00* (2013.01)

(56) References Cited

U.S. PATENT DOCUMENTS

| | | |
|---|---|---|
| 2015/0005000 A1 | 1/2015 | Gyorfi et al. |
| 2016/0150361 A1* | 5/2016 | Zhu .......................... G01S 19/14 455/456.1 |
| 2016/0188631 A1* | 6/2016 | Deb ................. G06F 17/30241 707/687 |
| 2016/0316325 A1* | 10/2016 | Sadr ......................... H04W 4/02 |
| 2017/0064490 A1* | 3/2017 | Jin ........................... H04W 4/02 |
| 2018/0027519 A1* | 1/2018 | Lee ......................... H04W 16/28 455/456.1 |

* cited by examiner

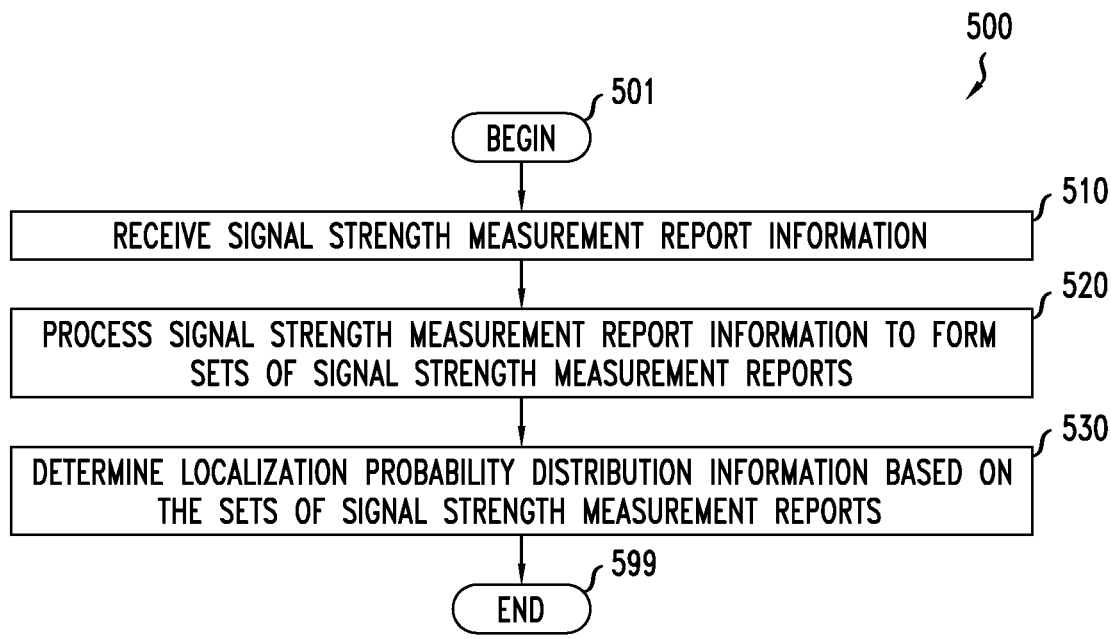

FIG. 6

PSEUDOCODE 600

Input: $\{\tilde{R}_k(t_i)\}_{i=1}^{T}$, $M$, $G_r$, $N_{th}$
Output: Location estimates $\{\tilde{x}_i\}_{i=1}^{T}$ 1: Sample $N$ particles $Pj = \{\tilde{x}_1^{(j)}, \tilde{v}_1^{(j)}\}$, $j \in [N]$ from prior distribution $(\tilde{x}_1, \tilde{v}_1 | G_r)$ 2: For each particle $j \in [N]$ initialize importance weights $\tilde{w}_1^{(j)} \leftarrow p(\tilde{R}_k(t_1) | \tilde{x}_1^{(j)})$ 3: Normalize weights $w_1^{(j)} \leftarrow \tilde{w}_1^{(j)} / \sum_{l=1}^{N} \tilde{w}_1^{(l)}$, $j \in [N]$ 4: for $i = 2$ to $T$ do 5:     for each particle $j \in [N]$ do 6:         Sample new state $\{\tilde{x}_i^{(j)}, \tilde{v}_i^{(j)}\}$ from distribution $p(\tilde{x}_i^{(j)}, \tilde{v}_i^{(j)} | \tilde{x}_{i-1}^{(j)}, \tilde{v}_{i-1}^{(j)}, G_r)$ and append this state to particle $Pj$ 7:         Update weight $\tilde{w}_i^{(j)}$ as product of previous weight $\tilde{w}_{i-1}^{(j)}$ and likelihood of current observation $\tilde{R}_k(t_i)$ 8:     end for 9:     Normalize weights $w_i^{(j)} \leftarrow \dfrac{\tilde{w}_i^{(j)}}{\sum_{l=1}^{N} \tilde{w}_i^{(l)}}$, $j \in [N]$ 10:     $\tilde{N}_{eff} \leftarrow \dfrac{1}{\sum_{l=1}^{N} (w_i^{(l)})^2}$ 11:     if $N_{eff} < N_{th}$ then 12:         Sample $N$ particles with replacement from current particle set $Pj\,_{j=1}^{N}$ with probabilities $w_i^{(j)}\,_{j=1}^{N}$ and update particle set with the new sampled set 13:         Reset weights $w_i^{(j)} \leftarrow \dfrac{1}{N}$ for $j \in [N]$ 14:     end if 15: end for 16: Compute $j^* = \arg\max_{j \in [N]} w_T^{(j)}$ 17: Output location estimate sequence $\{\tilde{x}_i^{(j^*)}\}_{i=1}^{T}$

AUTONOMOUS LOCALIZATION IN WIRELESS NETWORKS

TECHNICAL FIELD

The present disclosure relates generally to communication networks and, more particularly but not exclusively, to supporting localization in wireless communication networks.

BACKGROUND

Existing wireless communication networks typically support localization capabilities for determining locations of mobile devices of the existing wireless communication networks. Two existing techniques for localization of mobile devices in existing wireless communication networks are triangulation and radio frequency (RF) fingerprinting. Additionally, certain location based services (LBSs) also may be used for localization of mobile devices of existing wireless communication networks. However, such localization techniques may be problematic in that such techniques typically require explicit execution as well as support of special features in the radio access network and on the mobile devices. Furthermore, localization techniques have not yet been established for expected future wireless communication networks.

SUMMARY

The present disclosure generally discloses autonomous localization in wireless networks. In at least some embodiments, an apparatus is provided. The apparatus is configured to support autonomous localization in wireless networks. The apparatus includes a processor and a memory communicatively connected to the processor. The processor is configured to receive a sequence of observations of a mobile device of a wireless network comprising a set of wireless access devices configured to support a set of mobile devices. The processor is configured to determine a localization of the mobile device based on the sequence of observations of the mobile device and localization probability distribution information, wherein the localization probability distribution information is based on signal strength measurement reporting information that includes localization identification information, cell identification information associated with cells of the wireless access devices, wireless beam identification information associated with wireless beams of the wireless access devices, and signal strength measurement information. In at least some embodiments, a non-transitory computer-readable storage medium stores instructions which, when executed by a computer, cause the computer to perform a corresponding method supporting autonomous localization in wireless networks. In at least some embodiments, a corresponding method supporting autonomous localization in wireless networks is provided.

BRIEF DESCRIPTION OF THE DRAWINGS

The teachings herein can be readily understood by considering the following detailed description in conjunction with the accompanying drawings, in which:

FIG. 5 depicts an example of a method for determining localization probability distribution information configured to support autonomous localization of mobile devices in a wireless communication network;

FIG. 6 depicts an example of pseudocode for a method for using a particle filter for autonomous localization of mobile devices in a wireless communication network.

To facilitate understanding, identical reference numerals have been used, where possible, to designate identical elements that are common to the figures.

DETAILED DESCRIPTION

Figure 1:
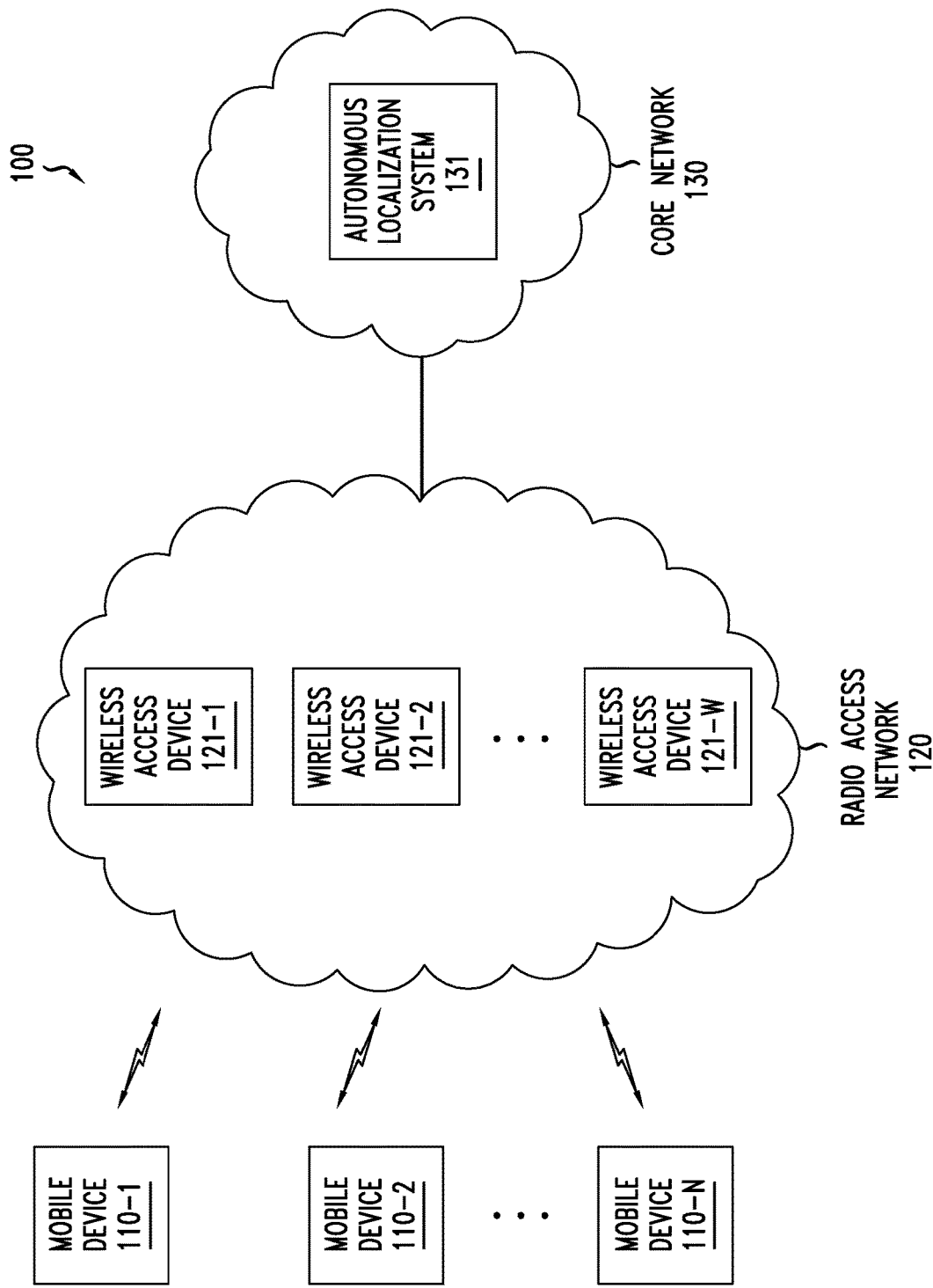
FIG. 1 depicts a wireless communication system configured to support autonomous localization of mobile devices.

The present disclosure generally discloses an autonomous localization capability configured to support autonomous localization of mobile devices in a wireless communication network. The autonomous localization capability configured to support autonomous localization of mobile devices in a wireless communication network may be configured to determine the localization of a mobile device of the wireless communication network based on a sequence of observations reported by the mobile device (e.g., a sequence of signal strength measurement reports of the mobile device) and a model that represents the motion and observations of mobile devices of the wireless communication network. The model that represents the motion and observations of the mobile devices may be a Hidden Markov Model (HMM). The HMM configured to support autonomous localization of mobile devices in a wireless communication network may be constructed based on use of localization information (e.g., location, velocity, or the like, as well as various combinations thereof) to define the hidden states of the HMM and based on use of signal strength measurement reporting information (e.g., localization identification information, cell identification information, beam identification information, and signal strength information) to define possible observations of the HMM. The localization problem for determining a localization of a given mobile device then becomes a maximum a posterior (MAP) problem represented by the HMM, which may be solved using a particle filter based localization algorithm using localization probability distribution information (e.g., probabilities of observing certain sequences at given locations). The localization probability distribution information for the particle filter based localization algorithm may be determined based on use of machine learning (e.g., for learning the distribution of observations conditioned on given localizations which are the states). The localization probability distribution information for the particle filter based localization algorithm may be determined based on the signal strength measurement reporting information which, as indicated above, includes localization identification information, cell identification information (e.g., cell identifiers), beam identification information (e.g., beam indices, which may be available within various types of wireless communication networks), and signal strength information (e.g., signal strength values). It is noted that, as discussed further below, use of the beam identification information to determine the localization probability distribution information for the particle filter based localization algorithm may provide significant improvements in localization of mobile devices. The localization of the mobile device of the wireless communication network may include various types of localization, such as location localization, trajectory localization (e.g., a combination of location and velocity), or the like, as well as various combinations thereof). The localization of mobile devices is autonomous, thereby obviating the need for explicit triggering of localization (although it is noted that such explicit triggering may be supported), obviating the need for the radio access network or the mobile devices to support special features (although it is noted that such features may be supported), or the like. It will be appreciated that these and various other embodiments and advantages or potential advantages of the autonomous localization capability may be further understood by way of reference to the example wireless communication system of FIG. 1.

FIG. 1 depicts a wireless communication system configured to support autonomous localization of mobile devices.

The wireless communication system 100 may be any type of wireless communication system suitable for supporting communications of mobile devices. For example, the wireless communication system 100 may be a Third Generation (3G) wireless communication system, a Fourth Generation (4G) wireless communication system (e.g., a Long Term Evolution (LTE) system), a Fifth Generation (5G) wireless communication system, or the like.

The wireless communication system 100 includes a set of mobile devices (MDs) 110-1-110-N (collectively, MDs 110), a radio access network (RAN) 120 including a set of wireless access devices (WADs) 121-1-121-W (collectively, WADs 121), and a core network (CN) 130 including an autonomous localization system (ALS) 131.

The MDs 110 may include any types of devices which may communicate via the RAN 120. For example, the MDs 110 may include cellular phones, smartphones, tablet computers, laptop computers, machine-type-communication (MTC) devices, Internet-of-Things (IoT) devices, or the like. The MDs 110 also may be referred to herein as User Equipments (UEs) or using other terms which may be specific to certain types of devices which may be used as the MDs 110 or certain types of wireless technology which may be used to provide the RAN 120 and the CN 130.

The MDs 110 are configured for wireless communication via WADs 121 of the RAN 120. The MDs 110 may support various functions typically supported by mobile devices communicating via wireless communication networks, such as authentication, authorization, bearer establishment, uplink and downlink communications via bearers or other channels, feedback of status information (e.g., signal strength information, channel condition information, or the like), accounting functions, or the like, as well as various combinations thereof. The MDs 110 may be configured to support feedback of various types of information which may be collected by various elements (e.g., elements of the RAN 120, elements of the CN 130, or other elements) for various purpose. The feedback information provided by the MDs 110 may vary across different types of wireless technology which may be used to provide the RAN 120 and the CN 130.

The MDs 110 may be mobile and may communicate wirelessly via various WADs 121 of the RAN 120 as the MDs 110 move around. The MDs 110 may or may not have localization capabilities (e.g., Global Positioning System (GPS) capabilities or the like) enabled or otherwise available under various conditions. The localization of the MDs 110, when such localization capabilities are enabled or otherwise available for tracking the localization of the MDs 110, may be performed based on such localization capabilities. The localization of the MDs 110, when such localization capabilities are not enabled or otherwise available for tracking the localization of the MDs 110, may be performed based on the autonomous localization capabilities presented herein. In other words, the autonomous localization capabilities presented herein may be employed to determine or estimate the localizations of MDs 110 when other mechanisms for determining the localizations of the MDs 110 are unavailable (although it will be appreciated that they also may be used where such other mechanisms for determining the localizations of the MDs 110 are available, e.g., for verification purposes, to obtain localization information to be used for other purposes, or the like).

The RAN 120 is configured to support radio access network functions typically supported by a radio access network in supporting communications of mobile devices such as MDs 110. For example, the RAN 120 may support various functions typically supported by radio access networks in supporting communications of mobile devices via wireless communication networks, such as authentication, authorization, bearer establishment, uplink and downlink communications via bearers or other channels, handling of status information received from mobile devices (e.g., signal strength information, channel condition information, or the like), generation of status information, accounting functions, or the like, as well as various combinations thereof.

The WADs 121 may include various types of wireless access devices configured to support wireless communications of the MDs 110. The WADs 121 that are deployed may depend on the type of wireless technology used to provide the RAN 120 and the CN 130. For example, in the case of a 3G wireless network, the WADs 121 may include NodeBs. For example, in the case of a 4G LTE wireless network, the WADs 121 may include evolved NodeBs (eNodeBs). For example, in the case of a 5G wireless network, the WADs 121 may include remote radio heads (RRHs). For example, the WADs 121 may include various other types of cellular-based access devices which may be deployed (e.g., micro cell devices, pico cell devices, femto cell devices, or the like, as well as various combinations thereof).

The WADs 121 are configured to support wireless communications of the MDs 110. The WADs 121 may support various functions typically supported by wireless access devices in supporting communications of mobile devices via wireless communication networks, such as authentication, authorization, bearer establishment, uplink and downlink communications via bearers or other channels, handling of status information received from mobile devices (e.g., signal strength information, channel condition information, or the like), generation of status information, accounting functions, or the like, as well as various combinations thereof. The WADs 121 may be configured to support handling of feedback of various types of information provided by MDs 110. The feedback information received from the MDs 110 may vary across different types of wireless technology which may be used to provide the RAN 120 and the CN 130.

The WADs 121 support communications using antennas which may be used by the MDs 110 for communication via the wireless communication network system 100. The antennas may be antenna arrays with geometries that allow formation of grids of beams in the coverage areas of the cells provided by the WADs 121. In 4G LTE networks, for example, the antenna arrays may be Massive-Multiple-Input and Multiple-Output (M-MIMO) antenna arrays. In 5G networks, for example, the antenna arrays may be M-MIMO antenna arrays, New Radio (NR) antenna arrays, or the like. It will be appreciated that M-MIMO and other antenna techniques may be used to improve spectral efficiency. It will be appreciated that various other types of antenna arrays may be used by WADs 121 of RAN 120.

The MDs 110 and WADs 121, as discussed above, are configured to support feedback from the MDs 110 to the WADs 121. The feedback information may include signal strength measurement reports. The signal strength measurement report of an MD 110, where the MD 110 receives multiple reference signals, may be a signal strength measurement report for the best reference signal (e.g., the greatest signal strength) detected by the MD 110. The signal strength measurement report may include a cell ID of a cell, a beam index of a beam of the cell, and an indication of a signal strength reported by the MD 110. The signal strength measurement report may have localization information of the MD 110 for the signal strength measurement report associated therewith (e.g., in the case of signal strength measurement reports which may be used to construct an HMM) or may not have localization information of the MD 110 for the signal strength measurement report (e.g., geographic location, a combination of geographic location and velocity, or the like) associated therewith (e.g., in the case of signal strength measurement reports provided by an MD 110 for which localization is to be determined). The signal strength measurement reports may vary across different types of wireless technology which may be used to provide the RAN 120 and the CN 130.

In the case of a 4G LTE wireless network, for example, the signal strength measurement reports may include an indication of the received power on the reference signal and the beam index of the corresponding beam. The received power on the reference signal may be indicated using a Reference Signal Received Power (RSRP) parameter, a Reference Signal Received Quality (RSRQ) parameter, or the like, as well as various combinations thereof. The received power may be measured at the MD 110 based on various reference signals. For example, the received power may be measured at the MD 110 based on the channel state information-reference signal (CSI-RS), in which case the received power may be referred to as the CSI-RS-based received power (CSR-RS-RP). It will be appreciated that the received power on the reference signal may be indicated using other parameters, the received power may be measured at the MD 110 in other ways, or the like, as well as various combinations thereof.

In the case of 5G wireless networks, for example, since 5G wireless networks are expected to use M-MIMO with beam forming, the signal strength measurement report from an MD 110 to a WAD 121 may include an indication of the received power on the reference signal and the beam index of the corresponding beam. The received power on the reference signal may be indicated using one or more parameters. The received power may be measured at the MD 110 based on various reference signals. For example, the received power may be measured at the MD 110 based on the secondary synchronization signal (SSS), in which case the received power may be referred to as the SSS-based received power (SSSRP). For example, the received power may be measured at the MD 110 based on the channel state information-reference signal (CSI-RS), in which case the received power may be referred to as the CSI-RS-based received power (CSR-RS-RP). It will be appreciated that the received power on the reference signal may be indicated using other parameters, the received power may be measured at the MD 110 in other ways, or the like, as well as various combinations thereof.

It will be appreciated that, although primarily described above with respect to embodiments in which the MD 110 sends signal strength measurement information for the best reference signal detected by the MD 110 at each reporting time (e.g., a single signal strength measurement report for the best reference signal detected by the MD 110 at each reporting time), in at least some embodiments the MD 110 may send signal strength measurement information for the N best reference signals detected by the MD 110 (e.g., associated with different beams, different WADs 121, or the like, as well as various combinations thereof), where such signal strength measurement information may be sent using a single signal strength measurement report for the N best reference signals detected by the MD 110 at each reporting time, using N signal strength measurement reports for the N best reference signals detected by the MD 110 at each reporting time, or so forth).

The CN 130 is configured to support core network functions typically supported by a core network in supporting communications of mobile devices such as MDs 110. For example, the CN 130 may support various functions typically supported by core networks in supporting communications of mobile devices via wireless communication networks, such as authentication, authorization, bearer establishment, interfacing to data networks (e.g., public data networks such as the Internet, private data networks such as enterprise networks, or the like), accounting functions, or the like, as well as various combinations thereof.

The ALS 131 is configured to support autonomous localization of MDs 110. The ALS 131 may be configured to support autonomous localization of an MD 110 based on a sequence of observations reported by the MD 110 (e.g., signal strength measurement reports of the mobile device) and a model that represents the motion and observations of MDs 110 of the wireless communication system 100. The sequence of observations of the MD 110 may be obtained from signal strength measurement reports received from the MD 110. The model that represents the motion and observations of the mobile devices may be an HMM configured to support autonomous localization of MDs 110 in the wireless communication system 100. The HMM configured to support autonomous localization of MDs 110 in the wireless communication system 100 may be constructed based on use of localization information (e.g., location, velocity, or the like, as well as various combinations thereof) to define the hidden states of the HMM and based on use of signal strength measurement reporting information (e.g., localization identification information, cell identification information, beam identification information, signal strength information, or the like) to define possible observations of the HMM. The HMM, including construction and use of the HMM, may be further understood by way of reference to FIGS. 2 and 5. The localization problem for determining a localization of a given mobile device then becomes a maximum a posterior (MAP) problem represented by the HMM, which may be solved using a particle filter based localization algorithm using localization probability distribution information (e.g., probabilities of observing a certain sequences at given locations). The localization probability distribution information for the particle filter based localization algorithm may be determined based on use of machine learning (e.g., for learning the distribution of observations conditioned on given localizations which are the states). The localization probability distribution information for the particle filter based localization algorithm may be determined based on signal strength measurement reporting information including localization identification information, cell identification information (e.g., cell identifiers), beam identification information (e.g., beam indices, which may be available within various types of wireless communication networks), and signal strength information (e.g., signal strength values). The use of a particle filter based localization algorithm using localization probability distribution information to autonomously determine the localization of the MD 110 may be further understood by way of reference to FIG. 6. The localization of the MD 110 that is determined by the ALS 131 may be expressed in terms of a sequence of states of the HMM that are identified based on matching of the sequence of observations of the MD 110 to the possible observations of the HMM, which may include information such as location localization information (e.g., a sequence of locations), trajectory localization information (e.g., a sequence of pairs of location and associated velocity), or the like.

The ALS 131 may use the localization information determined for MDs 110 to perform or trigger various actions which may be provided based on the localization information determined for the MDs 110. For example, the localization information determined for an MD 110 may be used to send alerts or recommendations to the MD 110 (e.g., alerts that may be of interest to the associated user (e.g., traffic alerts, nearby event alerts, or the like), recommendations for nearby businesses, or the like, as well as various combinations thereof). For example, the localization information determined for an MD 110 may be used to send alerts or recommendations to one or more other MDs 110 (e.g., an alert that the MD 110 is in the vicinity). For example, the localization information determined for an MD 110 may be used to label the sequence of observations of the MD 110 that were used to determine the localization of the MD 110 (e.g., where the sequence of observations of the MD 110 is considered to be unlabeled when received as the observations do not include localization information and may then be updated to include the localization information determined for the observations, respectively). For example, the localization information determined for an MD 110 may be provided to location based services (LBS) elements which may be configured to provide various LBSs to the MD 110 based on the localization information of the MD 110. For example, the localization information determined for an MD 110 may be provided to various applications or services which may be configured to provide various functions or services to or for the MD 110 based on the localization information of the MD 110. The ALS 131 may use the localization information determined for MDs 110 to perform or trigger various other actions which may be provided based on the localization information determined for the MDs 110.

It will be appreciated that, although omitted for purposes of clarity, the wireless communication system 100 may include various other elements which may support communications by the mobile devices, which may support autonomous localization of the mobile devices, or the like, as well as various combinations thereof.

Figure 2:
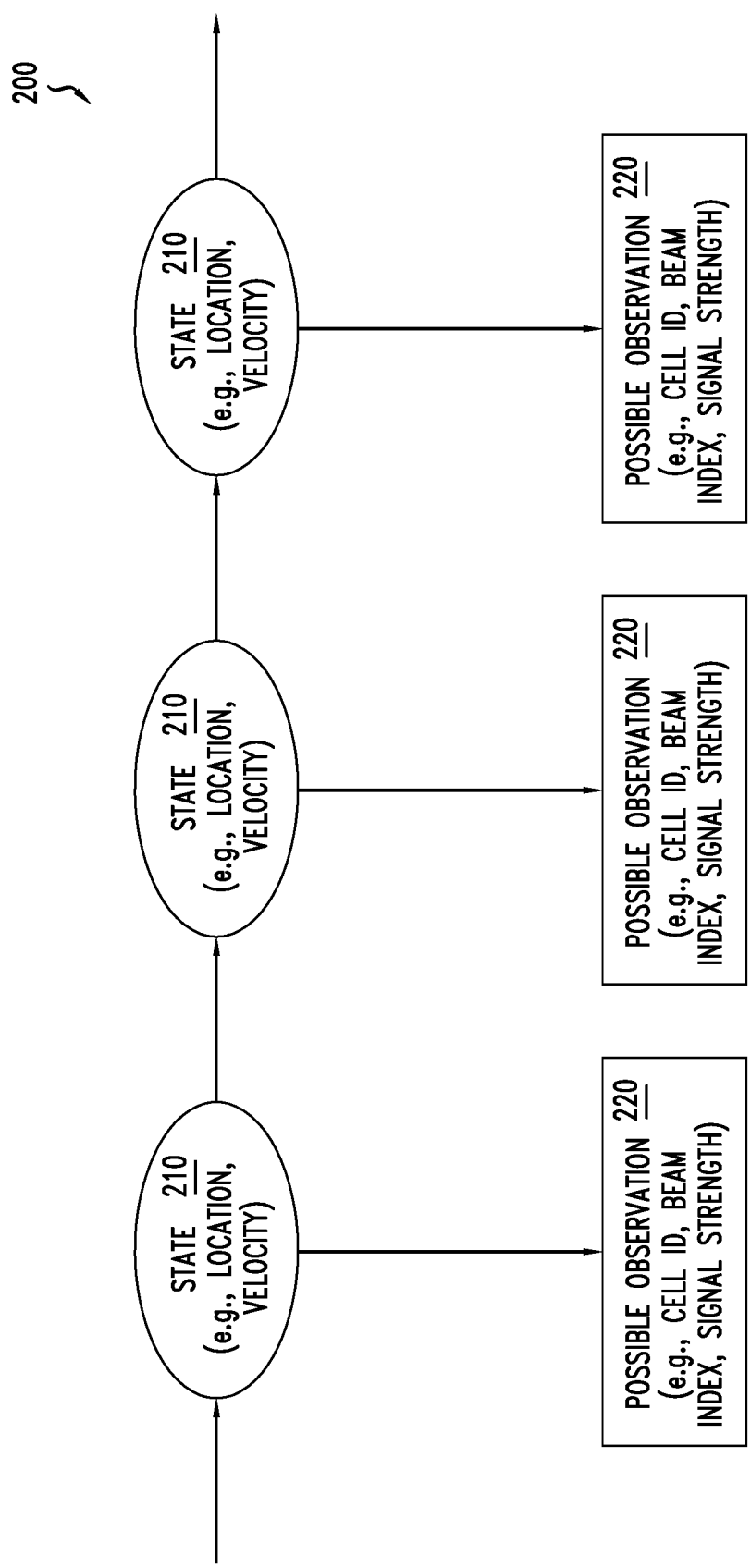
FIG. 2 depicts a Hidden Markov Model (HMM) configured to support autonomous localization of mobile devices in a wireless communication network.

FIG. 2 depicts a Hidden Markov Model (HMM) configured to support autonomous localization of mobile devices in a wireless communication network.

The HMM 200 includes a set of states 210 and a set of possible observations 220. The states 210 each have one or more of the possible observations 220 associated therewith, where the possible observations 220 represent potential measurement states which may potentially be observed, or reported, by a given mobile device when in the associated state 210. The HMM 200 also includes state transitions between states 210 and output transitions between states 210 and possible observations 220. The HMM 200 is configured such that it is possible to infer the hidden state of a mobile device (one or more of the states 210 which, in this case, represent the localization of the mobile device) based on transition probabilities for the state transitions between states 210 and based on transition probabilities for output transitions between states 210 and possible observations 220 (which are indicative of the probability that the respective possible observations 220 are observed, or reported, by the mobile device in the associated state 210). The states 210 and possible observations 220, and associated transition probabilities, are discussed further below.

The states 210, as indicated above, are hidden states representing potential localization states of mobile devices. The localization states may be defined based on various types of localization information (e.g., locations, a combination locations and velocities, or the like). The locations may be two-dimensional (2D) locations, e.g., geographic locations, which may be specified in terms of latitude and longitude, range and azimuth, or the like. The locations may be three-dimensional (3D) locations, e.g., a combination of geographic locations and altitude, which may be specified in terms of latitude, longitude, and altitude (e.g., where altitude may be specified in terms of range, azimuth, and elevation). The localization states may be specified at various levels of granularity. For example, the geographic locations of the localization states may be specified at increments of 10 meters, 50 meters, 200 meters, or the like. For example, the altitudes of the localization states may be specified at increments of 10 feet, 30 feet, 100 feet, or the like. For example, the velocities of the localization states may be specified at increments of 5 miles per hour, 10 miles per hour, or the like. It will be appreciated that the localization states may be specified based on other types of localization information, using other granularities of localization information, or the like, as well as various combinations thereof.

The possible observations 220, as indicated above, represent potential measurement states of mobile devices. The measurement states of the mobile devices represent potential combinations of measurement information which may be received in signal strength measurement reports from the mobile devices. The measurement states of the mobile devices may be defined based on various types of measurement information which may be reported by mobile devices (e.g., cell index, beam index, and received power, or the like, as well as various combinations thereof). For example, as depicted in FIG. 2, measurement states of mobile devices may be defined based on a combination of cell index, beam index, and received power. For example, although omitted from FIG. 2, measurement states of mobile devices may be defined based on a combination of cell index and received power. The measurement states may be specified at various levels of granularity of the received power (which may depend on the granularity of received power reporting by the mobile devices that is supported). For example, the received power of the measurement states may be specified at increments of 5 dB, 10 dB, 20 dB, or the like. It will be appreciated that the measurement states may be specified based on other types of measurement information, using other granularities of localization information, or the like, as well as various combinations thereof.

The state transitions are potential transitions between states 210. It is noted that, for each state 210, there may be state transitions from that state 210 to one or more other states 210. The state transitions have associated therewith state transition probabilities indicative of the probabilities of those state transitions (illustrated using the lines between the states 210). The state transition probability from a first state 210 to a second state 210 represents the likelihood of a mobile device moving from the geographic location that is represented by the first state 210 to the geographic location that is represented by the second state 210. For example, from a current state 210 associated with a particular geographic location, there may be a 36% chance that the mobile device moves to a state 210 that is north of the current state 210, a 27% chance that the mobile device moves to a state 210 that is east of the current state 210, a 24% chance that the mobile device moves to a state 210 that is south of the current state 210, and a 13% chance that the mobile device moves to a state 210 that is west of the current state 210. The state transitions and state transition probabilities may be based on various aspects of localization. For example, state transitions and state transition probabilities may be based on geographic characteristics of geographic locations associated with the states 210, characteristics of roadways or other pathways which could be traveled by users with mobile devices, characteristics of buildings where users with mobile devices could be located, or the like, as well as various combinations thereof.

The output transitions are associations between states 210 and possible observations 220. It is noted that, for each state 210, there may be output transitions from that state 210 to one or more possible observations 220. The output transitions have associated therewith output transition probabilities indicative of the probabilities of those output transitions (illustrated using the lines between the states 210 and the possible observations 220). The output transition probability from a state 210 to a possible observation 220 represents the likelihood of a mobile device reporting that possible observation 220 (as compared with other potential observations which are possible when the mobile device is within that state 210) when the mobile device is located in the geographic location represented by that state 210. For example, a state 210 associated with a particular geographic location and velocity may have a 25% chance of having a first measurement observation associated therewith (e.g., cell ID=3, beam index=6, signal strength=−50 dB), a 20% chance of having a second measurement observation associated therewith (e.g., cell ID=3, beam index=6, signal strength=−75 dB), a 15% chance of having a third measurement observation associated therewith (e.g., cell ID=3, beam index=4, signal strength=−130 dB), a 10% chance of having a fourth measurement observation associated therewith (e.g., cell ID=3, beam index=4, signal strength=−95 dB), a 10% chance of having a fifth measurement observation associated therewith (e.g., cell ID=8, beam index=2, signal strength=−80 dB), a 9% chance of having a sixth measurement observation associated therewith (e.g., cell ID=1, beam index=3, signal strength=−110 dB), a 7% chance of having a seventh measurement observation associated therewith (e.g., cell ID=8, beam index=1, signal strength=−105 dB), and a 4% chance of having an eighth measurement observation associated therewith (e.g., cell ID=2, beam index=1, signal strength=−115 dB). The output transitions and output transition probabilities may be based on various aspects of localization. For example, output transitions and output transition probabilities may be based on the geographic locations of the wireless access devices, the configurations of the wireless access devices, signal propagation characteristics of geographic locations associated with the wireless access devices, or the like, as well as various combinations thereof.

The HMM 200 may be defined based on various types of source information which may be obtained from various information sources and based on various analysis capabilities which may be used to process the source information from the information sources in order to provide the HMM 200.

The HMM 200, as noted above, may be defined based on various types of source information which may be obtained from various information sources. The HMM 200 may be defined based on source information that includes the types of information used to define the states 210 and the possible observations 220 (e.g., based on combinations of geographic location, cell identifier, beam identifier, and signal strength). The source information may be based on historical information collected from mobile devices or drive test devices, real-time or near-real-time information collected from mobile devices or drive test devices, or the like, as well as various combinations thereof. The historical information may be in the form of repositories of per call measurement data (PCMD) records stored across the network, which are potentially recorded and stored for various mobile devices (and even potentially at all times for all mobile devices). The HMM 200 may be defined based on information received from mobile devices on which GPS is active (in which case the mobile devices may be viewed as being drive test devices). The HMM 200 may be defined based on drive test data having geolocation information associated with it. The HMM 200 may be defined based on various combinations of such source information which may be obtained from various combinations of such information sources.

The HMM 200, as noted above, may be defined based on various analysis capabilities which may be used to process the source information from the information sources in order to provide the HMM 200. The HMM 200 may be defined based on learning of the distribution of observations conditioned on given locations (e.g., for each potential location of a mobile device, there is an x % probability of the mobile device reporting a signal strength of −55 dB on beam 6 of cell 2, there is a y % probability of the mobile device reporting a signal strength of −95 dB on beam 3 of cell 7, and so forth). The learning of the distribution of observations conditioned on given locations may be based on use of machine learning. The machine learning may be based on various types of machine learning algorithms which may be applied for learning the distribution of observations conditioned on given locations (e.g., random forest, support vector machine (SVM), or the like).

The HMM 200 may be refined as various types of source information continue to be obtained from various information sources. The HMM 200 may be refined periodically based on source information obtained from various information sources since the last time that the HMM 200 was refined. The HMM 200 may be refined dynamically as source information obtained from various information sources. The data of the HMM 200 (e.g., states 210, possible outcomes 220, probabilities, and so forth) may be updated using various data processing techniques. For example, signal strength values may be updated using weighted combinations of previous signal strength values. For example, velocities may be updated by computing a new velocity as a weighted combination of the previous velocity and a new random sample. For example, probability values for various locations may be updated as the observation distribution changes at those locations. The HMM 200 may be refined using various combinations of such techniques.

The HMM 200 may be defined and refined based on various organizations of the data (e.g., based on various organizations of data which may include geographic locations as the states 210 and combinations of observations data (e.g., cell ID, beam index, and signal strength) as the possible observations 220. For example, the source data may be preprocessed into data sets based on mobile locations having the same serving cell ID and the same reported best beam index (it is noted that there may be multiple best beam indexes per mobile location where different UEs may report multiple best beam indexes for a given mobile location) and the distribution of signal strength values within the data sets may then be determined (e.g., based on machine learning algorithms). For example, the source data may be preprocessed into data sets by viewing the beam index as the observation and the locations as the features so as to obtain the distribution of the beam index per location (which may then be used in combination with other distributions, such as the distribution of signal strengths, in order to determine localizations of mobile devices). It will be appreciated that the HMM 200 may be defined and refined based on various organizations of the data.

It will be appreciated that, since the HMM 200 may be used to determine the localization of a mobile device at a particular location or as the mobile device moves between a sequence of locations (thus tracking the mobility of the mobile device), the HMM 200 also may be referred to herein a localization model (for tracking mobile device localization) or a mobility model (for tracking mobile device mobility).

Figure 3:
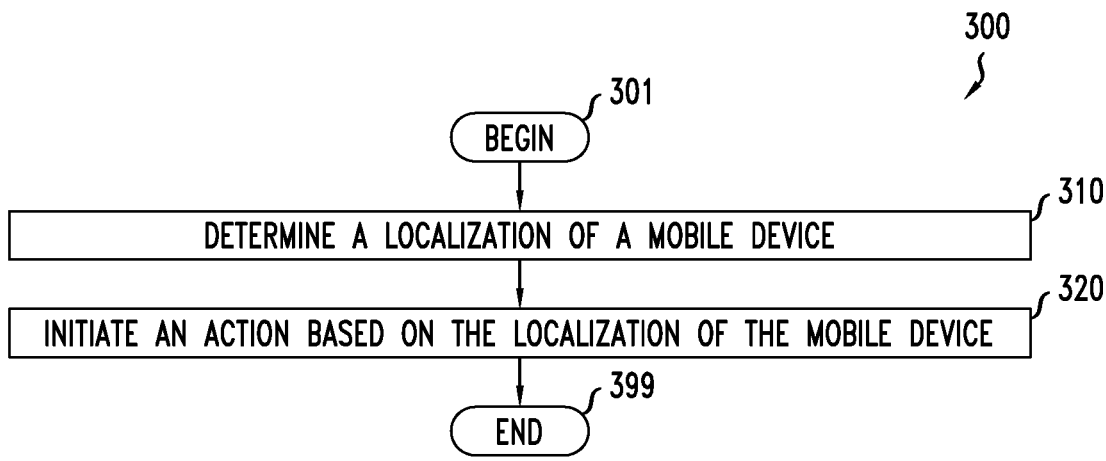
FIG. 3 depicts an example of a method for supporting autonomous localization of mobile devices in a wireless communication network.

FIG. 3 depicts an example of a method for supporting autonomous localization of mobile devices in a wireless communication network. It will be appreciated that, although method 300 is primarily presented as being performed serially, at least a portion of the functions of method 300 may be performed contemporaneously or in a different order than as presented in FIG. 3.

At block 301, method 300 begins.

At block 310, a localization of a mobile device is determined. The localization of the mobile device may be determined based on a sequence of observations of the mobile device and based on localization probability distribution information. The determination of the localization of a mobile device may be further understood by way of reference to FIGS. 1 and 2. An example of a method for determining a localization of a mobile device is presented with respect to FIG. 4. The localization of the mobile device may be a location-based localization (e.g., a geographic location of the mobile device), a trajectory-based localization (e.g., a combination of geographic location and velocity of the mobile device), or the like, as well as various combinations thereof).

At block 320, an action is initiated based on the localization of the mobile device. The action may be sending an alert or recommendation to the mobile device, labeling the sequence of observations of the mobile device that were used to determine the localization of the mobile device, providing the localization of the mobile device to one or more LBSs which may be configured to provide various LBSs to the mobile device based on the localization of the mobile device, providing the localization of the mobile device to one or more applications or services which may be configured to provide various functions or services to or for the mobile device based on the localization of the mobile device, or the like, as well as various combinations thereof.

At block 399, method 300 ends.

Figure 4:
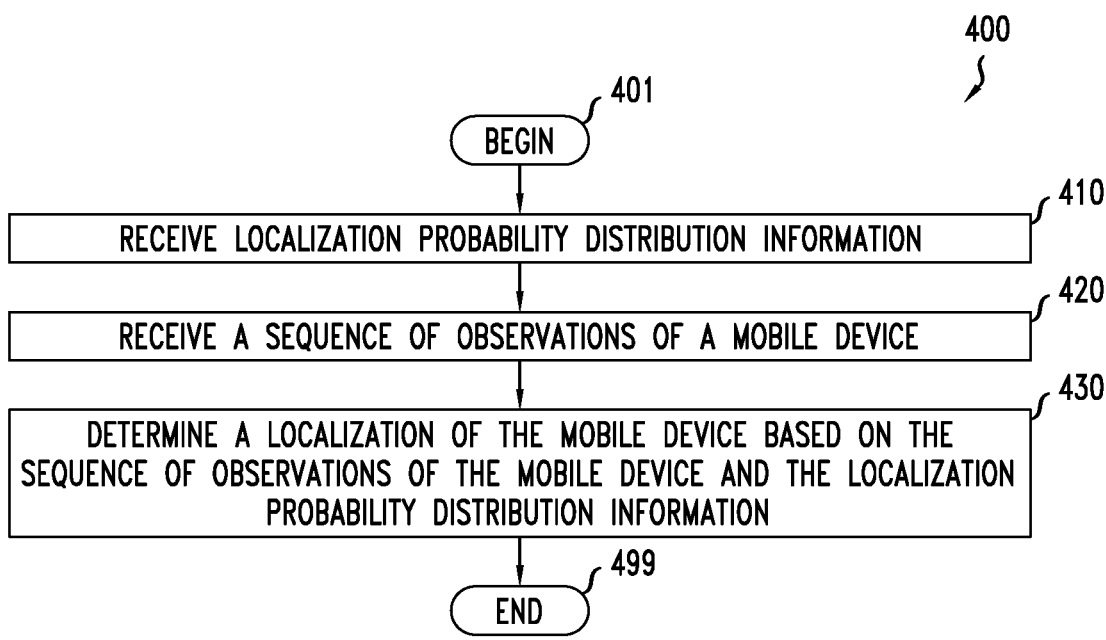
FIG. 4 depicts an example of a method for supporting autonomous localization of mobile devices in a wireless communication network.

FIG. 4 depicts an example of a method for supporting autonomous localization of mobile devices in a wireless communication network. It will be appreciated that, although method 400 is primarily presented as being performed serially, at least a portion of the functions of method 400 may be performed contemporaneously or in a different order than as presented in FIG. 4.

At block 401, method 400 begins.

At block 410, localization probability distribution information is determined. The localization probability distribution information may be based on signal strength measurement reporting information that includes localization identification information, cell identification information associated with cells of wireless access devices of the wireless communication network, wireless beam identification information associated with wireless beams of the wireless access devices of the wireless communication network, and signal strength measurement information. The signal strength measurement reporting information may be obtained from mobile devices, drive test devices, or other suitable sources of such information. The localization probability distribution information may be represented in the form of an HMM or other suitable framework for representing the localization probability distribution information. The localization probability distribution information may be further understood by way of reference to FIGS. 1 and 2. An example of a method for determining localization probability distribution information configured to support autonomous localization of mobile devices in a wireless communication network is presented with respect to FIG. 5.

At block 420, a sequence of observations of a mobile device is received. The sequence of observations of the mobile device may be a sequence of signal strength measurement reports of the mobile device. The sequence of signal strength measurement reports of the mobile device may include, for each signal strength measurement report, the cell ID of the cell, the beam index of the beam, and an indication of the signal strength measured by the mobile device. The sequence of observations of the mobile device may be further understood by way of reference to FIGS. 1 and 2.

At block 430, a localization of the mobile device is determined based on the sequence of observations of the mobile device and based on the localization probability distribution information. The determination of the localization of the mobile device based on the sequence of observations of the mobile device and based on the localization probability distribution information may be further understood by way of reference to FIGS. 1 and 2. An example of pseudocode for a method for using a particle filter for autonomous localization of mobile devices in a wireless communication network is presented with respect to FIG. 6.

At block 499, method 400 ends.

FIG. 5 depicts an example of a method for determining localization probability distribution information configured to support autonomous localization of mobile devices in a wireless communication network. It will be appreciated that, although method 500 is primarily presented as being performed serially, at least a portion of the functions of method 500 may be performed contemporaneously or in a different order than as presented in FIG. 5.

At block 501, method 500 begins.

At block 510, signal strength measurement reporting information is received. The signal strength measurement reporting information includes localization identification information, cell identification information associated with cells of wireless access devices of the wireless communication network, wireless beam identification information associated with wireless beams of the wireless access devices of the wireless communication network, and signal strength measurement information. For example, a given signal strength measurement report may include localization information (e.g., a geographic location associated with the signal strength measurement report, a combination of geographic location and velocity associated with the signal strength measurement report, or the like), the cell ID of the cell, the beam index of the beam, and an indication of the measured signal strength associated with that beam of that cell. The signal strength measurement reports of the signal strength measurement report information may be signal strength measurement reports provided by mobile devices (e.g., with GPS turned on or for which associated localization information is available and may be added to or associated with the measurement report), signal strength measurement reports provided by drive test devices, or the like, as well as various combinations thereof. The signal strength measurement report information may be obtained from historical measurement report information (e.g., PCMD records or similar records). The signal strength measurement report information may be sourced from various combinations of such sources, in various other ways, or the like, as well as various combinations thereof.

At block 520, the signal strength measurement report information is processed to form sets of signal strength measurement reports. The sets of signal strength measurement reports may be defined based on combinations of localization, cell ID, and beam index (e.g., each signal strength measurement report that includes the same localization, cell ID, and beam index is put into a set of signal strength measurement reports associated with that localization, cell ID, and beam index). This provides, for each combination of localization, cell ID, and beam index, a set of signal strengths reported for that combination of localization, cell ID, and beam index, which may then be processed to determine probabilities of respective signal strength values being observed and reported by mobile devices for that cell ID and beam index at that given localization.

At block 530, localization probability distribution information is determined based on the sets of signal strength measurement reports. The localization probability distribution information may be determined by, for each set of signal strength measurement reports (e.g., each combination of localization, cell ID, and beam index), processing the signal strength values in the signal strength measurement reports in that set of signal strength measurement reports to obtain a probability distribution for that set of signal strength measurement reports. For example, where there are 1000 signal strength measurement reports associated with a particular combination of localization, cell ID, and beam index, the probability distribution for that set of signal strength measurement reports may be as follows: 22% of reports (220 reports) reporting a signal strength of −50 dB, 19% of reports (190 reports) reporting a signal strength of −80 dB, 16% of reports (160 reports) reporting a signal strength of −60 dB, 12% of reports (120 reports) reporting a signal strength of −70 dB, 10% of reports (100 reports) reporting a signal strength of −100 dB, 9% of reports (80 reports) reporting a signal strength of −90 dB, 7% of reports (70 reports) reporting a signal strength of −120 dB, 4% of reports (40 reports) reporting a signal strength of −100 dB, 1% of reports (10 reports) reporting a signal strength of −130 dB, and 0% of reports (0 reports) reporting a signal strength of −140 dB. The localization probability distribution information may include, for each set of signal strength measurement reports (and, thus, each combination of localization, cell ID, and beam index), probability distribution information indicative of probabilities of respective signal strength values being observed and reported by mobile devices for that cell ID and beam index at that given localization. It will be appreciated that the localization probability distribution information may be represented in various ways (e.g., using an HMM or other suitable framework for representing the localization probability distribution information).

At block 599, method 500 ends.

FIG. 6 depicts an example of pseudocode for a method for using a particle filter for autonomous localization of mobile devices in a wireless communication network.

The pseudocode 600 is configured to accept input information and produce output information. The input to the pseudocode 600 is the sequence of observations of the mobile device (denoted as $\{\tilde{R}_k(t_i)\}_{i=1}^T$), the channel model (denoted as M), the geographic location information (denoted as $G_r$), and the particle resampling threshold (denoted as $N_{th}$). The channel model is used to estimate the localization probability distribution information, providing the combined likelihood distribution from the measurement report information (e.g., the likelihood of observing a particular best beam indicee and a particular RSRP measurement). The geographic location information $G_r$ may be in the form of a graph. The geographic location information $G_r$ may include maps of geographic locations, maps of roadways, or the like, as well as various combinations thereof. The output of the pseudocode 600 is the set of localization estimates of the mobile device (denoted as $\{\tilde{x}_i\}_{i=1}^T$) which correspond to the sequence of observations of the mobile device ($\{\tilde{R}_k(t_i)\}_{i=1}^T$).

The pseudocode 600, as discussed further below, uses particles to construct potential sequences of localization estimates which may be output as the set of localization estimates of the mobile device ($\{\tilde{x}_i\}_{i=1}^T$). The particles representing the potential sequences of localization estimates which may be output as the set of localization estimates of the mobile device ($\{\tilde{x}_i\}_{i=1}^T$) may be constructed by, for each of the particles, considering the observations in sequence and selecting associated localization estimates for the respective observations to provide thereby the potential sequences of localization estimates of the particles. The particles representing the potential sequences of localization estimates which may be output as the set of localization estimates of the mobile device ($\{\tilde{x}_i\}_{i=1}^T$) have weights associated therewith, which are updated as the localization estimates are selected for the respective observations to provide thereby the potential sequences of localization estimates of the respective particles. The weights associated with the potential sequences of localization estimates which may be output as the set of localization estimates of the mobile device ($\{\tilde{x}_i\}_{i=1}^T$) may be updated as products of probabilities of the localization estimates selected for the respective observations to provide thereby the potential sequences of localization estimates of the respective particles. In this manner, the final weights associated with the completed potential sequences of localization estimates of the respective particles provide indications of the probabilities of those potential sequences of localization estimates of the respective particles being the correct sequence of localization estimates for the sequence of observations of the mobile device ($\{\tilde{R}_k(t_i)\}_{i=1}^T$) (e.g., the potential sequence of localization estimates having the highest weight may be output as the set of localization estimates of the mobile device ($\{\tilde{x}_i\}_{i=1}^T$). The manner in which pseudocode 600 operates to construct the potential sequences of localization estimates of the particles and provide the associated tracking of the weights of the potential sequences of localization estimates of the particles is discussed in additional detail below.

In Line 1 of the pseudocode 300, N particles are created for use in constructing N potential sequences of localization estimates available for selection as the set of localization estimates of the mobile device ($\{\tilde{x}_i\}_{i=1}^T$) for the sequence of observations of the mobile device ($\{\tilde{R}_k(t_i)\}_{i=1}^T$). The N particles are created by sampling N particles from localization probability distribution information (denoted as $p(\tilde{x}_1, \tilde{v}_1|G_r)$), which also may be referred to herein a prior distribution of particles. The localization probability distribution information is associated with localizations which could be selected for inclusion within the particles. The localization probability distribution information may include, for each combination of localization, cell ID, and beam index, probability distribution information for signal strengths on that beam index of that cell for that localization (which, as discussed further below, may be used to compute weights for the particles for use in evaluating the particles as being likely to be the correct sequence of localization estimates for the sequence of observations). It is noted that the prior distribution of particles can consider the estimated geometry coverage of beams. The particles, initially, are potential localizations of the mobile device in the first state based on the associated first observation in the sequence of observations. The particles may be selected based on the first observation in the sequence of observations. For example, where the first observation includes a particular cell ID and beam index, the particles may be selected from a set of potential localizations within the area that is covered by that beam of that cell. The particles may be selected randomly or deterministically. The particles may be selected uniformly or may be selected non-uniformly. The particles may be selected based on characteristics of the geographic area from which the particles may be selected, such as based on conditions that make it unlikely that the mobile device is located there (e.g., not sampling or sampling relatively lightly from areas in which mobile devices are unlikely to be located, such as on bodies of water or inside of buildings where it is known that the mobile device is moving with a particular velocity), based on conditions that make it likely that the mobile device is located there (e.g., along roadways where it is known that the mobile device is moving with a particular velocity), or the like, as well as various combinations thereof. As indicated above, the particles will be updated with additional potential localizations of the mobile device, to provide thereby respective sequences of potential localizations of the mobile device associated with the sequence of observations of the mobile device, as the additional observations in the sequence of observations are considered.

In Line 2 of the pseudocode 600, for each of the particles selected in Line 1 (for the first observation in the sequence of observations), an importance weight is initialized for the respective particle. The selected particles are denoted as $j\in[N]$. The initial importance weight for a given particle may be initialized based on the localization probability distribution information (e.g., based on the probability distribution information for the signal strengths on the given beam index of the given cell for the given localization associated with the given particle). For example, the initial importance weight for a particle (denoted as $\tilde{w}_1^{(j)}$) may be initialized as a probability of the first observation in the sequence of observations (e.g., based on the probability of the observed signal strength on the observed beam index of the observed cell as reported by the mobile device in the first observation in the sequence of observations) given the localization of that particle (i.e., a probability that the first observation in the sequence of observations is observed at the localization of that particle). This is represented as $\tilde{w}_1^{(j)} \leftarrow p(\tilde{R}_k(t_1)|\tilde{x}_1^{(j)})$. As indicated above, the importance weights of the particles will be updated, based on updating of the particles to include additional potential localizations of the mobile device to provide thereby the respective sequences of potential localizations of the mobile device associated with the sequence of observations of the mobile device, as the additional observations in the sequence of observations are considered.

In Line 3 of the pseudocode 600, for each of the particles selected in Line 1 (for the first observation in the sequence of observations), the importance weight that was initialized for the particle (denoted as $\tilde{w}_1^{(j)}$ is normalized with respect to the set of weights associated with the set of particles (for each of the particles $j\in[N]$). This is represented as $w_1^{(j)} \leftarrow [\tilde{w}_1^{(j)}/\Sigma_{i=1}^N \tilde{w}_1^{(i)}]$, $j\in[N]$.

In Lines 4-15 of the pseudocode 600, the remaining observations in the sequence of observations are processed, for each of the particles, such that the particles become the potential sequences of localization estimates which may be output as the set of localization estimates of the mobile device (denoted as $\{\tilde{x}_i\}_{i=1}^T$) which have weights associated therewith (as discussed above, with the weights representing the respective likelihoods that the respective potential sequence of localization estimates of the respective particle is the correct sequence of localization estimates for the sequence of observations).

In Line 4 of the pseudocode 600, the loop for cycling through the remaining observations in the sequence of observations is established. This is depicted as a "for" loop (denoted as "for i=2 to T do").

In Line 5 of the pseudocode 600, for each of the remaining observations in the sequence of observations, the loop for cycling through the particles, for updating the particles based on the respective observations (namely, for adding potential localizations to the respective particles for each observation and updating the weights of the respective particles based on the addition of the potential localizations to the particles for each observation), is established. This is represented as a "for" loop (denoted as "for each particle $j\in[N]$ do").

In Line 6 of the pseudocode 600, for the given particle that is being updated (based on the loop through Line 5) for the given observation that is being considered (based on the loop through Line 4), a new localization state is sampled and appended to the particle (thereby adding to the sequence of potential localizations for the particle). The new localization state may be sampled based on the previous localization state in the sequence of potential localizations of the particle. The new localization state may be sampled based on the probability distribution of transitions between localization states. For example, the new localization state may be sampled based on the probability distribution of transitions between localization states by selecting the state transition having the highest probability, selecting the state transition having the highest probability given some known information (e.g., geographic characteristics of geographic locations associated with the localization states, characteristics of roadways or other pathways which could be traveled by users with mobile devices, characteristics of buildings where users with mobile devices could be located, or the like, as well as various combinations thereof). This is represented as "sample new state $\{\tilde{x}_i^{(j)}, \tilde{v}_i^{(j)}\}$ from distribution $p(\tilde{x}_i^{(j)}, \tilde{v}_i^{(j)}|\tilde{x}_{i-1}^{(j)}, \tilde{v}_{i-1}^{(j)}, G_r)$ and append this new state to particle $P_j$".

In Line 7 of the pseudocode 600, for the given particle that is being updated (based on the loop through Line 5) for the given observation that is being considered (based on the loop through Line 4), the weight associated with the particle is updated based on the new state that was appended to the particle (in Line 6). The weight associated with the particle may be updated based on the previous weight of the particle (at the time that the previous localization state was added to the particle) and the likelihood of the given observation that is being considered. Here, again, the likelihood of the given observation that is being considered may be determined based on the localization probability distribution information (e.g., based on the probability distribution information for the signal strengths on the given beam index of the given cell for the given localization associated with the given particle). For example, the likelihood of the given observation that is being considered may be a probability of the given observation in the sequence of observations (e.g., based on the probability of the observed signal strength on the observed beam index of the observed cell as reported by the mobile device in the given observation in the sequence of observations) given the new localization associated with the new state that was appended to the particle (i.e., a probability that the given observation in the sequence of observations is observed at the new localization associated with the new state that was appended to the particle). This is represented as $\tilde{w}_1^{(j)} \leftarrow p(\tilde{R}_k(t_1)|\tilde{x}_1^{(j)})$. The weight associated with the particle may be updated as a product of previous weight of the particle (at the time that the previous localization state was added to the particle) and the likelihood of the given observation that is being considered. This is represented as "update weight $\tilde{w}_i^{(j)}$ as product of previous weight $\tilde{w}_{i-1}^{(j)}$ and likelihood of current observation $\tilde{R}_k(t_i)$".

In Line 8 of the pseudocode 600, the loop for cycling through the particles, for the given observation in the sequence of observations, is checked. If all of the particles have not been updated for the given observation, then the pseudocode 600 returns to Line 5 and repeats Lines 6 and 7 for the next particle for the given observation. If all of the particles have been updated for the given observation, then the "for" loop started in Line 5 of pseudocode 600 is ended (denoted as "end for"). It is noted that, when the "for" loop started in Line 5 of pseudocode 600 is ended, additional processing is performed (Lines 9-14 of the pseudocode 600) before the next observation in the sequence of observation is considered (returning to Line 4 as long as there is still at least one observation that has not been evaluated).

In Line 9 of the pseudocode 600, for the given observation that is being considered (based on the loop through Line 4), the weights are normalized. The weights are the weights associated with particles $j \in [N]$ updated based on the given observation, respectively. This is represented as $\tilde{w}_i^{(j)} \leftarrow [\tilde{w}_i^{(j)}/\Sigma_{l=1}^N \tilde{w}_i^{(l)}]$, $j \in [N]$.

In Line 10 of the pseudocode 600, for the given observation that is being considered (based on the loop through Line 4), an effective value is computed. The effective value is computed based on the normalized weights (from Line 9). This is represented as $N_{eff} \leftarrow [1/\Sigma_{l=1}^N (\tilde{w}_i^{(l)})^2]$.

In Line 11 of the pseudocode 600, for the given observation that is being considered (based on the loop through Line 4), a determination is made as to whether the effective value ($N_{eff}$) satisfies a particle resampling threshold ($N_{th}$). This may be a determination as to whether the effective value ($N_{eff}$) is less than the particle resampling threshold ($N_{th}$). This is represented as an "if" statement (denoted as "if $N_{eff} < N_{th}$ then"). If the effective value ($N_{eff}$) is less than the particle resampling threshold ($N_{th}$), then the pseudocode 600 proceeds to Line 12 (and, thus, remaining within the "if" loop started at Line 11). If the effective value ($N_{eff}$) is not less than the particle resampling threshold ($N_{th}$), then the pseudocode 600 proceeds to Line 14 (thereby ending the "if" loop started at Line 11).

In Line 12 of the pseudocode 600, for the given observation that is being considered (based on the loop through Line 4), based on the determination that the effective value ($N_{eff}$) is less than the particle resampling threshold ($N_{th}$), the current particle set is updated with a new sampled set of particles to provide a new particle set. The new sampled set of particles is determined by sampling N new particles with replacement from the current particle set $\{P_j\}_{j=1}^N$ with probabilities $\{w_i^{(j)}\}_{j=1}^N$. The resampling effectively enables the replacement of unlikely samples with more likely samples.

In Line 13 of the pseudocode 600, for the given observation that is being considered (based on the loop through Line 4), based on the determination that the effective value ($N_{eff}$) is less than the particle resampling threshold ($N_{th}$), the weights of the particles in the new particle set (again denoted as $j \in [N]$) are reset. This is represented as $w_i^{(j)} \leftarrow [1/N]$ for $j \in [N]$.

In Line 14 of the pseudocode 600, the statement which triggers sampling with replacement is ended. This is denoted as "end if" which ends the "if" statement started in Line 11 of pseudocode 600. It is noted that additional processing is performed (Lines 16-17 of the pseudocode 600).

In Line 15 of the pseudocode 600, the loop for cycling through the sequence of observations is checked. If all of the observations have not been considered (i.e., i<T), then the pseudocode 600 returns to Line 4 and repeats Lines 5-14 for the next observation in the sequence of observations. If all of the observations have been considered (i.e., i=T), then the "for" loop started in Line 4 of pseudocode 600 is ended (denoted as "end for"). It is noted that, when the "for" loop started in Line 4 of pseudocode 600 is ended, additional processing is performed (Lines 16-17 of the pseudocode 600).

In Line 16 of the pseudocode 600, the particle having the highest weight is selected as the most likely sequence of localizations matching the sequence of observations. This may be represented as compute $j^* = \arg\max_{j \in [N]} w_T^{(j)}$. It will be appreciated that, since the weights of the particles are updated based on respective probabilities of potential localizations in the particles (and, potentially, using products of probabilities associated with the potential localizations in the particles), the weights represent respective likelihoods that the respective particles correspond to localizations matching the sequence of observations (e.g., the highest weight is indicative of a highest probability that the potential localizations in the associated particle correspond to localizations matching the sequence of observations).

In Line 17 of the pseudocode 600, the set of localization estimates of the selected particle (selected in Line 16) is output as the set of localization estimates of the mobile device (which also may be denoted as $\{\tilde{x}_i^{j*}\}_{i=1}^T$) which correspond to the sequence of observations of the mobile device (denoted as $\{\tilde{R}_k(t_i)\}_{i=1}^T$).

It will be appreciated that the pseudocode 600 merely represents one of many ways in which a particle filter may be used for determining the set of localization estimates of the mobile device which correspond to the sequence of observations of the mobile device.

It will be appreciated that, although primarily presented herein with respect to embodiments in which the localization probability distribution information may be based on distributions of a specific type of reported information (namely, signal strength values) for respective combinations of other types of reported information (namely, combinations of localization, cell ID, and beam index), in at least some embodiments localization probability distribution information may be based on distributions of other types of reported information (e.g., combinations of cell ID and beam indexes of the cell IDs) for respective combinations of other types of reported information (e.g., combinations of localization and signal strength values). It will be appreciated that, in such embodiments, the weights of the particle filter may be based on the probability distribution information provided for the other types of reported information (e.g., combinations of cell ID and beam indexes of the cell IDs) for the respective combinations of the other types of reported information (e.g., combinations of localization and signal strength values). It will be appreciated that the localization probability distribution information may be defined using other combinations of reported information.

It will be appreciated that, although primarily presented herein with respect to embodiments in which localization of mobile devices is based on use of locations as states and use of combinations of cell ID, beam index, and signal strength as possible observations, localization of mobile devices may be based on other arrangements of such information.

Various embodiments of the autonomous localization capability may provide various advantages or potential advantages. For example, various embodiments of the autonomous localization capability may enable a localization problem, of determining the localization of a mobile device, to be reformatted into a problem of finding an optimal or near-optimal solution for a mobile device (localization of the mobile device) given the observations reported by the mobile device and the observation distribution conditioned on the potential locations, which may be solved using a filter (e.g., a particle filter or other suitable filter). For example, various embodiments of the autonomous localization capability may enable implicit and autonomous localization of mobile devices where the localization of mobile devices may be considered to be implicit in that the localization algorithms do not need to be explicitly triggered and may be considered to be autonomous in that there is a mining architecture that allows for continuously running execution of such algorithms for autonomously enriching the localization datasets with mobile device localization information. For example, various embodiments of the autonomous localization capability may enable autonomous localization of mobile devices in a manner obviating the need for explicit triggering of localization by the mobile device or the network (such as may be required with LBSs, technologies such as Observed Time Difference of Arrival (OTDOA), or the like)), in a manner obviating the need for the radio access network or mobile devices to support special features (such as estimation of time difference amongst cells or the like), or the like, as well as various combinations thereof. For example, various embodiments of the autonomous localization capability, in 5G wireless networks, may enable leveraging of the unique signal strength measurement reports which may be supported by 5G wireless networks to provide autonomous localization of mobile devices in 5G wireless networks. For example, various embodiments of the autonomous localization capability may enable operators to perform localization of mobile devices at scale (e.g., based on use of machine learning approaches for mining of big data repositories of PCMD records stored across the network and potentially involving large numbers of cells (e.g., thousands, tens of thousands, hundreds of thousands, or the like) serving even larger numbers of mobile devices (e.g., millions of mobile devices, hundreds of millions of mobile devices, or the like)). Various embodiments of the autonomous localization capability may provide various other advantages or potential advantages.

Figure 7:
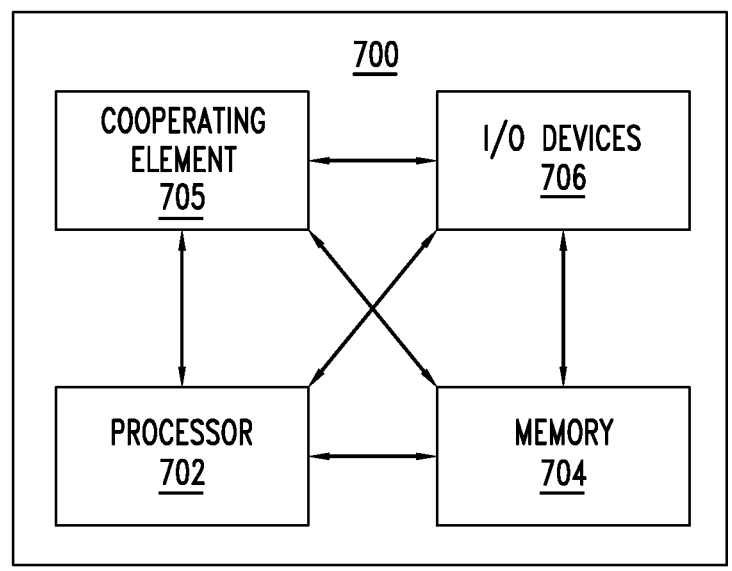
FIG. 7 depicts a high-level block diagram of a computer suitable for use in performing various functions presented herein.

FIG. 7 depicts a high level-block diagram of a computer suitable for use in performing various functions described herein.

The computer 700 includes a processor 702 (e.g., a central processing unit (CPU), a processor having a set of one or more processor cores, or the like) and a memory 704 (e.g., a random access memory (RAM), a read only memory (ROM), or the like). The processor 702 and the memory 704 are communicatively connected.

The computer 700 also may include a cooperating element 705. The cooperating element 705 may be a hardware device. The cooperating element 705 may be a process that can be loaded into the memory 704 and executed by the processor 702 to implement functions as discussed herein (in which case, for example, the cooperating element 705 (including associated data structures) can be stored on a non-transitory computer-readable storage medium, such as a storage device or other storage element (e.g., a magnetic drive, an optical drive, or the like)).

The computer 700 also may include one or more input/output devices 706. The input/output devices 706 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices or elements (e.g., a tape drive, a floppy drive, a hard disk drive, a compact disk drive, or the like), or the like, as well as various combinations thereof.

It will be appreciated that computer 700 of FIG. 7 may represent a general architecture and functionality suitable for implementing functional elements described herein, portions of functional elements described herein, or the like, as well as various combinations thereof. For example, computer 700 may provide a general architecture and functionality that is suitable for implementing one or more of an MD 110, a WAD 121, ALS 131, or the like.

It will be appreciated that the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
receive a sequence of observations of a mobile device of a wireless network comprising a set of wireless access devices configured to support a set of mobile devices, wherein, for each of the observations in the sequence of observations, the observation is defined based on a cell identifier of one of the cells, one or more beam indices associated with the one of the cells, and one or more corresponding signal strengths for the one or more beam indices associated with the one of the cells; and
determine a localization of the mobile device based on the sequence of observations of the mobile device and localization probability distribution information, wherein the localization probability distribution information is based on signal strength measurement reporting information that includes localization identification information, cell identification information associated with cells of the wireless access devices, wireless beam identification information associated with wireless beams of the wireless access devices, and signal strength measurement information, wherein the localization probability distribution information is represented using a localization model that includes a set of hidden states representing potential localizations that are based on the localization identification information and that also includes a set of potential observations representing potential signal strength measurement reports of mobile devices of the wireless network that are based on the cell identification information, the wireless beam identification information, and the signal strength measurement information, wherein the localization model is determined based on processing of the signal strength measurement reporting information to determine respective distributions of signal strength values for respective combinations of potential localizations, cell identifiers, and beam indices.

2. The apparatus of claim 1, wherein, for each of the observations in the sequence of observations, the observation comprises a signal strength measurement report of the mobile device.

3. The apparatus of claim 1, wherein the signal strength measurement reporting information is from at least one of one or more mobile devices of the wireless network or one or more drive test devices.

4. The apparatus of claim 1, wherein, for each of the hidden states in the set of hidden states of the localization model, the potential localization for the respective state is defined based on a respective geographic location or based on a respective combination of a geographic location and a velocity.

5. The apparatus of claim 1, wherein, for each of the potential observations in the set of potential observations of the localization model, the potential signal strength measurement report for the respective potential observation is defined based on a cell identifier of one of the cells, one or more beam indices associated with the one of the cells, and one or more corresponding signal strengths for the one or more beam indices.

6. The apparatus of claim 1, wherein the localization model is represented using a Hidden Markov Model (HMM).

7. The apparatus of claim 1, wherein the localization probability distribution information is determined based on use of machine learning for learning distributions of observations conditioned on given localizations.

8. The apparatus of claim 1, wherein, to determine the localization of the mobile device, the processor is configured to:
apply a particle filter based localization process using the localization probability distribution information.

9. The apparatus of claim 8, wherein, to apply the particle filter based localization process using the localization probability distribution information, the processor is configured to:
determine, based on the localization probability distribution information, a set of particles, each of the particles comprising a respective potential sequence of localization estimates for the mobile device and having a respective weight associated therewith; and
select, from the set of particles based on the respective weights of the particles, one of the particles as representing the localization of the mobile device.

10. The apparatus of claim 9, wherein the respective weights of the respective particles are determined based on the localization probability distribution information.

11. The apparatus of claim 8, wherein, to apply the particle filter based localization process using the localization probability distribution information, the processor is configured to:
sample a set of particles from a set of potential localizations of the wireless network based on an initial observation in the sequence of observations;
set, for each of the particles based on the localization probability distribution information, a respective initial importance weight for the respective particle; and
update, for each of the particles in the set of particles based on each remaining observation in the sequence of observations, the respective particle to include respective potential localization estimates for the mobile device for the respective remaining observations in the sequence of observations and to have a respective weight associated therewith.

12. The apparatus of claim 11, wherein, for each of the particles in the set of particles based on each remaining observation in the sequence of observations, the respective weight associated with the respective particle is updated based on a respective portion of the localization probability distribution information associated with the respective remaining observation in the sequence of observations.

13. The apparatus of claim 8, wherein, to apply the particle filter based localization process using the localization probability distribution information, the processor is configured to:

determine respective weights of potential sequence of localization estimates for the mobile device based on the localization probability distribution information.

14. The apparatus of claim 1, wherein the localization of the mobile device comprises a sequence of estimated locations of the mobile device associated with the sequence of observations of the mobile device.

15. The apparatus of claim 1, wherein the localization of the mobile device comprises a sequence of estimated locations and trajectories of the mobile device associated with the sequence of observations of the mobile device.

16. The apparatus of claim 1, wherein the processor is configured to:
perform an action based on the localization of the mobile device.

17. A non-transitory computer-readable storage medium storing instructions which, when executed by a computer, cause the computer to perform a method, the method comprising:
receiving a sequence of observations of a mobile device of a wireless network comprising a set of wireless access devices configured to support a set of mobile devices, wherein, for each of the observations in the sequence of observations, the observation is defined based on a cell identifier of one of the cells, one or more beam indices associated with the one of the cells, and one or more corresponding signal strengths for the one or more beam indices associated with the one of the cells; and
determining a localization of the mobile device based on the sequence of observations of the mobile device and localization probability distribution information, wherein the localization probability distribution information is based on signal strength measurement reporting information that includes localization identification information, cell identification information associated with cells of the wireless access devices, wireless beam identification information associated with wireless beams of the wireless access devices, and signal strength measurement information, wherein the localization probability distribution information is represented using a localization model that includes a set of hidden states representing potential localizations that are based on the localization identification information and that also includes a set of potential observations representing potential signal strength measurement reports of mobile devices of the wireless network that are based on the cell identification information, the wireless beam identification information, and the signal strength measurement information, wherein the localization model is determined based on processing of the signal strength measurement reporting information to determine respective distributions of signal strength values for respective combinations of potential localizations, cell identifiers, and beam indices.

18. A method, comprising:
receiving, by a processor, a sequence of observations of a mobile device of a wireless network comprising a set of wireless access devices configured to support a set of mobile devices, wherein, for each of the observations in the sequence of observations, the observation is defined based on a cell identifier of one of the cells, one or more beam indices associated with the one of the cells, and one or more corresponding signal strengths for the one or more beam indices associated with the one of the cells; and
determining, by the processor, a localization of the mobile device based on the sequence of observations of the mobile device and localization probability distribution information, wherein the localization probability distribution information is based on signal strength measurement reporting information that includes localization identification information, cell identification information associated with cells of the wireless access devices, wireless beam identification information associated with wireless beams of the wireless access devices, and signal strength measurement information, wherein the localization probability distribution information is represented using a localization model that includes a set of hidden states representing potential localizations that are based on the localization identification information and that also includes a set of potential observations representing potential signal strength measurement reports of mobile devices of the wireless network that are based on the cell identification information, the wireless beam identification information, and the signal strength measurement information, wherein the localization model is determined based on processing of the signal strength measurement reporting information to determine respective distributions of signal strength values for respective combinations of potential localizations, cell identifiers, and beam indices.

* * * * *